United States Patent
Noguchi (10) Patent No.: US 8,169,487 B2
(45) Date of Patent: May 1, 2012

(54) IMAGE-SHAKE CORRECTION APPARATUS AND IMAGING APPARATUS

(75) Inventor: Masaaki Noguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 12/611,709

(22) Filed: Nov. 3, 2009

(65) Prior Publication Data

US 2010/0110203 A1     May 6, 2010

(30) Foreign Application Priority Data

Nov. 4, 2008    (JP) ................................ 2008-282882

(51) Int. Cl.
     *H04N 5/228*      (2006.01)
     *G03B 17/00*      (2006.01)
     *G03B 13/00*      (2006.01)

(52) U.S. Cl. ............. 348/208.2; 348/208.3; 348/208.11; 396/52; 396/53; 396/55; 396/97

(58) Field of Classification Search ................ 348/208.1, 348/208.11, 208.12, 208.2, 208.3, 208.4, 348/208.5, 208.6, 208.7, 208.99, 220.1, 241, 348/244, 333.01, 333.13, 341; 396/52, 53, 396/54, 55, 97
See application file for complete search history.

(56) References Cited

U.S. PATENT DOCUMENTS

| | | | | |
|---|---|---|---|---|
| 5,617,176 A | * | 4/1997 | Matsuzawa et al. | 396/55 |
| 5,861,915 A | * | 1/1999 | Sato et al. | 348/208.2 |
| 6,407,771 B1 | * | 6/2002 | Kanbara et al. | 348/207.99 |
| 6,665,097 B1 | * | 12/2003 | Inagaki | 358/471 |
| 6,801,247 B1 | * | 10/2004 | Ohishi et al. | 348/208.1 |
| 6,822,688 B2 | * | 11/2004 | Ohta | 348/349 |
| 7,542,088 B2 | * | 6/2009 | Takemoto et al. | 348/333.08 |

FOREIGN PATENT DOCUMENTS

JP     2006-319852 A     11/2006

\* cited by examiner

*Primary Examiner* — Lin Ye
*Assistant Examiner* — Chriss Yoder, III
(74) *Attorney, Agent, or Firm* — Carter, DeLuca, Farrell & Schmidt, LLP

(57) ABSTRACT

An image-shake correction apparatus includes a shake detection unit configured to detect a shake applied to the image-shake correction apparatus, a shake correction unit configured to correct the shake of an image caused by the shake, a drive unit configured to drive the shake correction unit, a filtering unit configured to remove a specific frequency component from the output of the shake detection unit, a characteristic change unit configured to change the frequency characteristic of the filtering unit, and a temperature detection unit configured to detect temperature of the shake detection unit or a vivinity thereof, wherein the characteristic change unit changes the frequency characteristic of the filtering unit according to the change rate in temperature detected by the temperature detection unit.

16 Claims, 8 Drawing Sheets

TEMPERATURE & CHANGE RATE IN TEMPERATURE

TIME t

FIG. 6B

HPF CUTOFF FREQUENCY

TIME t

FIG. 6C

TEMPERATURE & CHANGE RATE IN TEMPERATURE

TIME t

FIG. 6D

HPF CUTOFF FREQUENCY

TIME t

FIG. 8

IMAGE-SHAKE CORRECTION APPARATUS AND IMAGING APPARATUS

BACKGROUND OF THE INVENTION

1. Field of the Invention

The present invention relates to an image-shake correction apparatus for correcting a shake of an image and an imaging apparatus with the image-shake correction apparatus.

2. Description of the Related Art

Until now, an angular velocity sensor (hereinafter, sometimes referred to as gyroscope sensor) has been used for an imaging apparatus with an image-shake correction function to detect an amount of a shake. The gyroscope sensor vibrates a vibration member such as a piezoelectric element at a constant frequency and converts generated force due to the Coriolis force to voltage to obtain angular velocity information.

The obtained angular velocity is integrated to detect the amount of a shake. A shift lens capable of optically moving in an angle of view, for example, is moved in the direction in which the amount of a shake is cancelled to correct the shake of an image.

Japanese Patent Application Laid-Open No. 2006-319852, for example, discusses an image-shake correction technique for an imaging apparatus. The image-shake correction apparatus discussed in the application optimizes the frequency characteristic of a characteristic change unit according to temperature detected by a temperature detection unit. Thus, the frequency characteristic of the image shake correction is optimized over a wide frequency band regardless of the ambient temperature of a camera maim body. As a result, sufficient correction of an image shake can be achieved by a correction unit.

When the frequency characteristic of the characteristic change unit is optimized according to the temperature detected by the temperature detection unit, an optimal process can be applied to the image-shake correction apparatus according to a plurality of shooting modes.

Japanese Patent Application Laid-Open No. 2006-319852 discussed a method for optimizing the frequency characteristic of the characteristic change unit according to the temperature detected by the temperature detection unit. A gain is decreased as temperature rises to extend the temperature characteristic of a gyroscope sensor to a high frequency band. For this reason, the cutoff frequency of a high pass filter (hereinafter, referred to as HPF) is lowered at a low temperature and the cutoff frequency thereof is increased at a high temperature. Thus, the temperature characteristic is optimized in response to change in temperature.

Because of the recent miniaturization of a circuit board, a gyroscope sensor needs to be arranged adjacent to an integrated circuit (IC), which is a heat source. Increase in function of an IC increases heat emitted therefrom. Accordingly, the gyroscope sensor has been exposed to an increase in temperature.

As a result, a temperature drift phenomenon of an output of the gyroscope sensor has become influential. A sudden increase in temperature of the gyroscope sensor due to heat generated by the IC at the time of staring the camera main body significantly changes the output signal of the gyroscope sensor. As a result, even if the camera main body is not shaken, the camera erroneously determines that a shake occurs. That causes a significant problem in which an image stabilization performance is significantly degraded.

The above conventional technique merely optimizes the cutoff frequency of a HPF according to temperature of the gyroscope sensor or its vivinity to prevent the image stabilization performance from being degraded. For this reason, a direct current (DC) component cannot be sufficiently removed when the output of the gyroscope sensor is changed due to a sudden change in temperature.

More specifically, when temperature is not so high even after the sudden change of the temperature, for example, such a case in which temperature is increased from a low temperature, the cutoff frequency of the HPF is not set high, thereby the image-shake correction apparatus will be affected by the output change due to the temperature drift.

On the other hand, if temperature is suddenly lowered from a high temperature, change in output is caused due to temperature drift similarly with the case where temperature is increased. In this case, the cutoff frequency of the HPF is reduced in the above conventional technique to cause the camera to be affected by change in output due to temperature drift.

The increase of the cutoff frequency of the HPF at a high temperature results in increase in phase lead at a low frequency band. That causes the cutoff frequency HPF condition to be not best for a shake of a low frequency band. As a result, a shake of an image in shooting a still image at a slow shutter speed cannot be corrected.

SUMMARY OF THE INVENTION

The present invention is directed to an image-shake correction apparatus and an imaging apparatus capable of preventing the influence of change in output signal of a shake detection unit due to temperature drift and the significant deterioration of an image-shake correction performance.

According to an aspect of the present invention, an image-shake correction apparatus includes a shake detection unit configured to detect a shake applied to the image-shake correction apparatus, a shake correction unit configured to correct the shake of an image caused by the shake, a drive unit configured to drive the shake correction unit, a filtering unit configured to remove a specific frequency component from the output of the shake detection unit, a characteristic change unit configured to change the frequency characteristic of the filtering unit, and a temperature detection unit configured to detect temperature of the shake detection unit or a vivinity thereof, wherein the characteristic change unit changes the frequency characteristic of the filtering unit according to the change rate in temperature detected by the temperature detection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
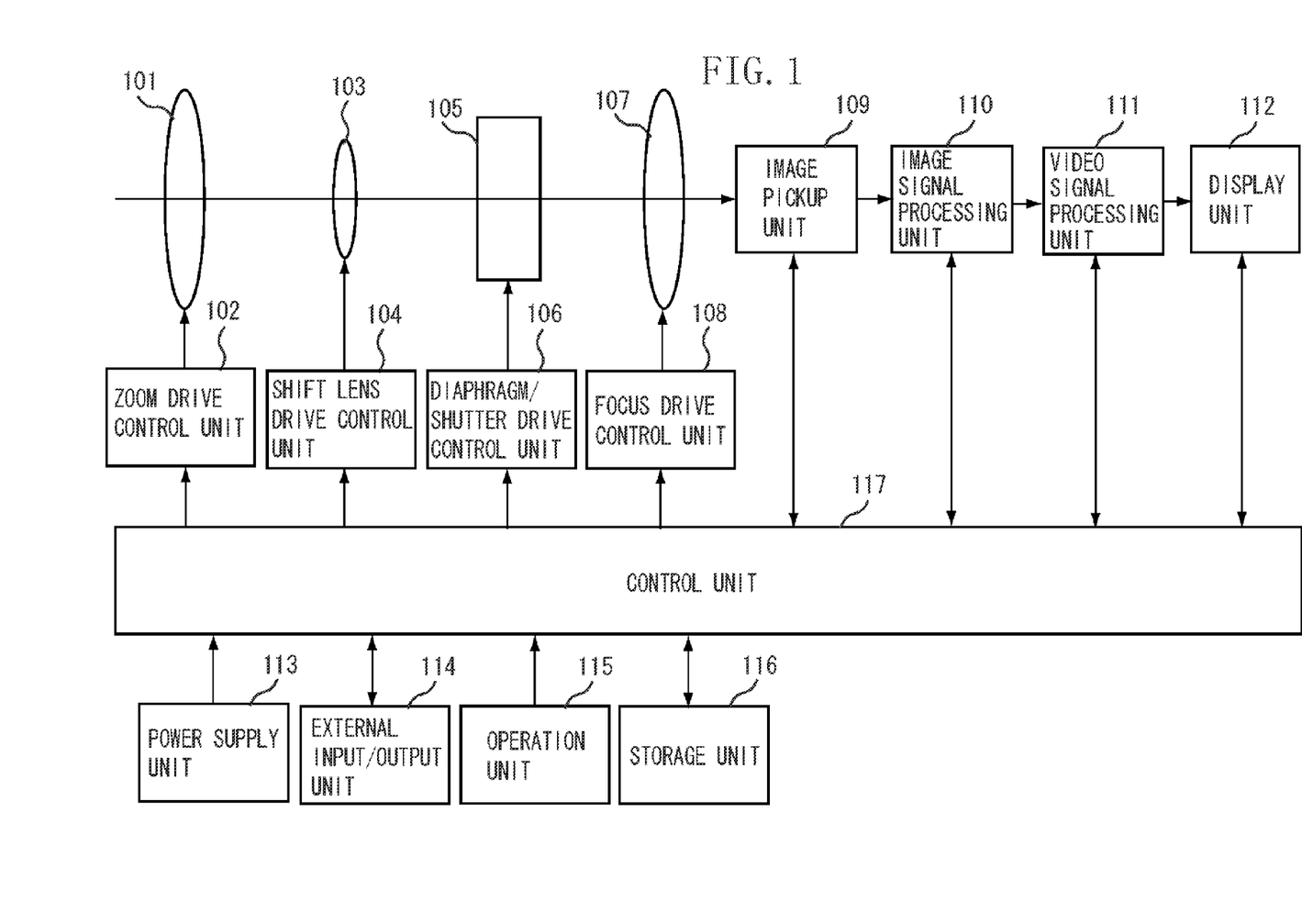
FIG. 1 is a block diagram illustrating an entire system of an imaging apparatus according to an exemplary embodiment of the present invention.

FIG. 1 is a block diagram illustrating an entire system of an imaging apparatus including an image-shake correction apparatus according to an exemplary embodiment of the present invention.

In FIG. 1, a zoom lens 101 is used to perform optical zooming. A zoom drive control unit 102 drives and controls the zoom lens 101.

A shift lens 103 is capable of changing angle of view and movable in a direction perpendicular to an optical axis. A shift lens drive control unit 104 drives and controls the shift lens 103.

A shutter drive control unit 106 drives and controls the diaphragm/shutter unit 105.

A focus lens 107 is used to perform focus adjustment. A focus drive control unit 108 drives and controls the focus lens 107.

An image pickup unit 109 converts a light image that has passed through lens groups into an electric signal. An image signal processing unit 110 converts an electric signal output from the image pickup unit 109 into a video signal. A video signal processing unit 111 processes the video signal output from the image signal processing unit 110 according to applications. A display unit 112 displays a signal output from the video signal processing unit 111 if needed.

A power supply unit 113 supplies power to the entire system. An external input/output unit 114 inputs and outputs communication and video signals from and to the external respectively. An operation unit 115 is used to operate the system by a user. A storage unit 116 stores various data such as video information. A control unit 117 controls the entire system. The shift lens drive control unit 104 mainly forms the image-shake correction apparatus.

The entire system of the imaging apparatus having the above configuration is described below.

When the operation unit 115 issues an instruction for zooming, the control unit 117 moves the zoom lens 101 to the instructed zoom position via the zoom drive control unit 102. The control unit 117 drives the focus lens 107 to adjust focus through the focus drive control unit 108 based on the video information processed in the image pickup unit 109 and the signal processing units (such as the image signal processing unit 110 and the video signal processing unit 111).

When the operation unit 115 further issues an instruction for shooting, focus is adjusted based on the video information and the diaphragm/shutter unit 105 is controlled to set an appropriate amount of exposure via the shutter drive control unit 106.

A light image is formed on the image pickup unit 109 and the obtained image information is stored in the storage unit 116. If the operation unit 115 issues an instruction to turn on an image-shake correction, the control unit 117 instructs the shift lens drive control unit 104 to correct a shake of an image. The shift lens drive control unit 104 continues the image-shake correction operation until an instruction to turn off the image-shake correction is issued.

The imaging apparatus can select a still image mode or a moving image mode, and change the operating conditions for actuators in respective modes.

Figure 2A:
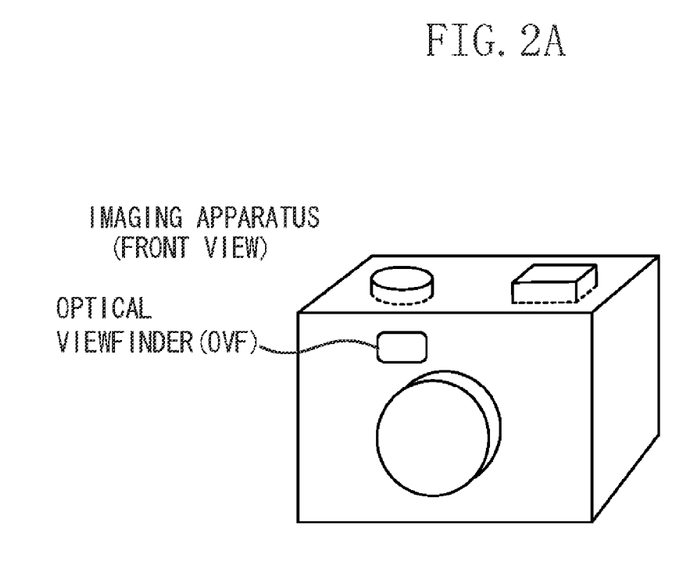
FIGS. 2A and 2B are perspective views illustrating a front and a rear view of the imaging apparatus in FIG. 1.
Figure 2B:
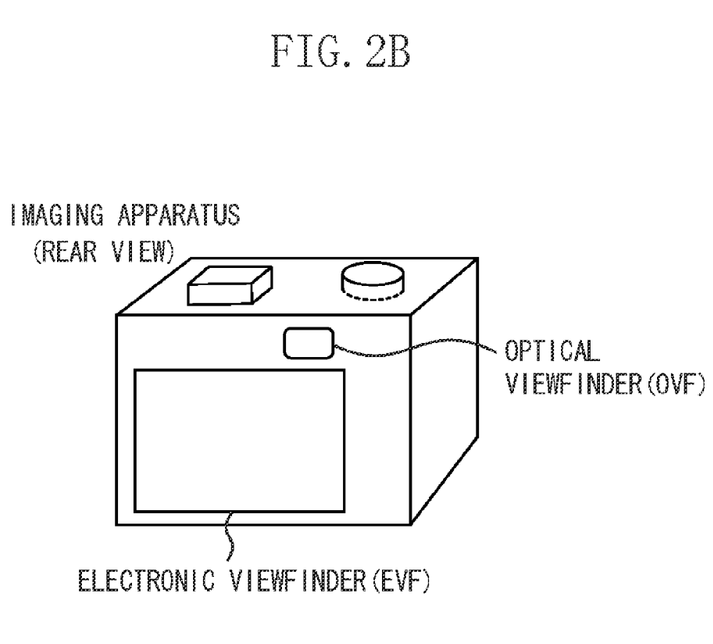

FIGS. 2A and 2B are perspective views illustrating the imaging apparatus according to a first exemplary embodiment of the present invention.

As illustrated in FIGS. 2A and 2B, optical viewfinders are arranged on the upper portions of the front and the rear face of the imaging apparatus. As illustrated in FIG. 2B, an electronic viewfinder is arranged on the rear face of the imaging apparatus.

When the optical viewfinder is used, switching to an optical viewfinder mode (hereinafter, referred to as OVF mode) is performed using the operation unit 115 by a user.

In the OVF mode, the image pickup unit 109, the image signal processing unit 110, the video signal processing unit 111 and the display unit 112 are brought into a power saving mode and return to a normal operation only at the time of shooting a still image. In the power saving mode, generated heat quantity is small in the image pickup unit 109 to the display unit 112. However, in the normal operation generated heat quantity is large in the image pickup unit 109 to the display unit 112.

Returning to an electronic viewfinder mode (hereinafter, referred to as EVF mode) by switching causes the image pickup unit 109 to the display unit 112 to return to a normal operation mode.

When normal still image and moving image shooting modes are switched to a play back mode, the image pickup unit 109 to the display unit 112 are brought into the power saving mode similarly with the above.

Figure 3:
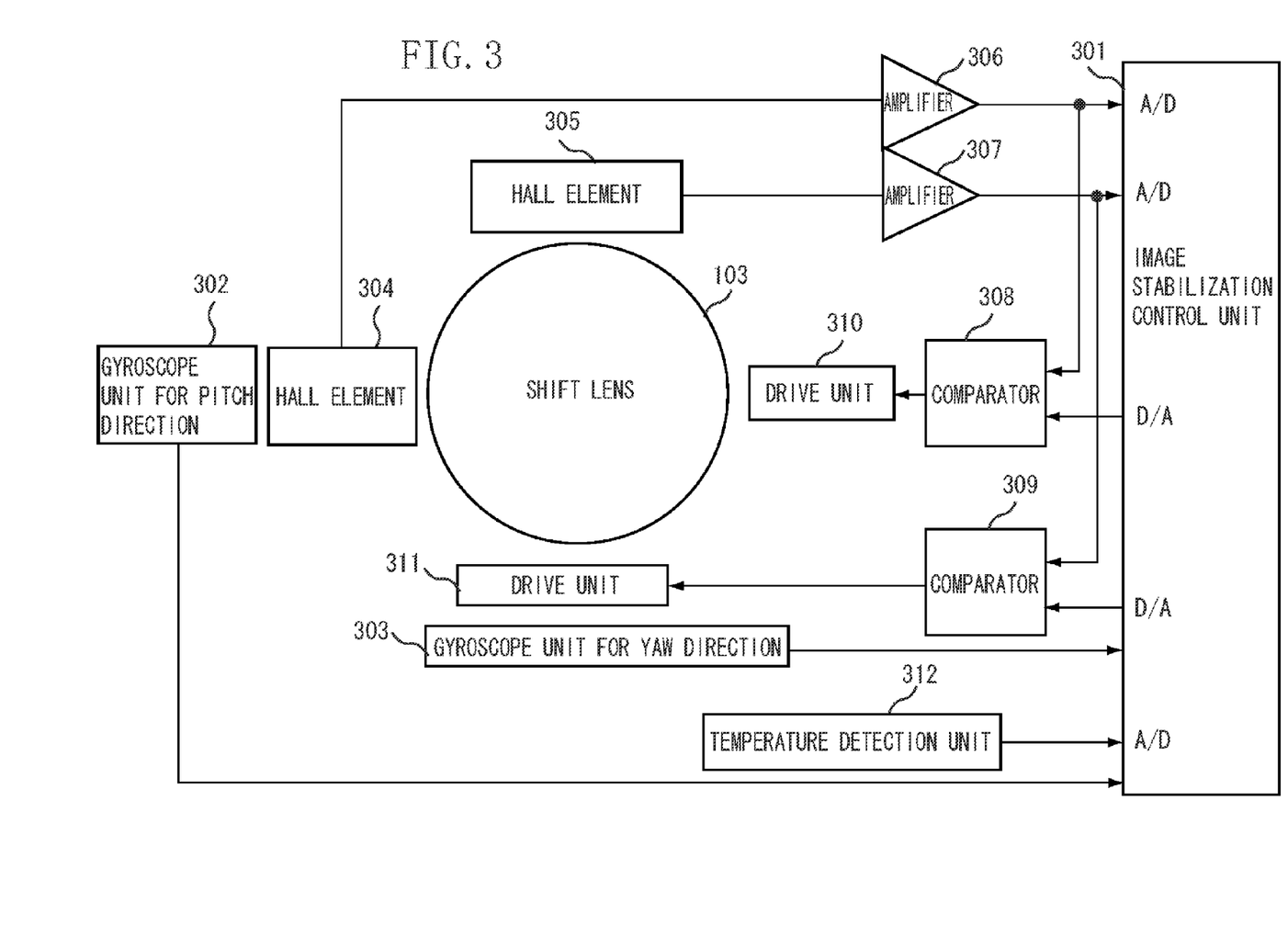
FIG. 3 is a block diagram illustrating details of a shift lens drive control unit in FIG. 1.

FIG. 3 is a block diagram illustrating details of the shift lens drive control unit 104 in FIG. 1.

In FIG. 3, an image stabilization control unit 301 performs an image stabilization (image-shake correction) control and the position control of the shift lens 103 according to situations. A gyroscope unit 302 (an angular velocity sensor) detects a shake (vibration) in a perpendicular direction (in the pitch direction) when the attitude of the imaging apparatus is in a normal position. A gyroscope unit 303 (an angular velocity sensor) detects a shake in the horizontal direction (in the yaw direction) similarly when the attitude of the imaging apparatus is in the normal position.

A Hall element 304 detects position of the shift lens 103 in the pitch direction. A Hall element 305 detects position of the shift lens 103 in the yaw direction.

Amplifiers 306 and 307 amplify signals from the Hall elements 304 and 305. Comparators 308 and 309 compare the position signals indicated by the image stabilization control unit 301 with shift-lens position signals output from the amplifiers 306 and 307.

Drive units 310 and 311 drive the shift lens 103 based on the signals output from the comparators 308 and 309. A temperature detection unit 312 detects the ambient temperature of the gyroscope unit 302 for the pitch direction and the gyroscope unit 303 for the yaw direction.

A position control of the shift lens 103 is described below.

The position control of the shift lens is performed such that the shift lens 103 is driven in the pitch and the yaw direction based on shake information (gyroscope signal) in the pitch and the yaw direction from the gyroscope units 302 and 303. More specifically, the position of a magnet, which is attached to the shift lens 103, is detected by the Hall elements 304 and 305. A feedback position control is performed so that the position signal is matched to the position instruction signal output from the image stabilization control unit 301 to control the position of the shift lens.

The shift lens 103 is moved in the direction opposite to the vibration direction so that the angle of field is not changed based on the position instruction signal, which is output from the image stabilization control unit 301, and the gyroscope signals, which is output from the gyroscope units 302 and 303 each for the pitch and the yaw direction. Thus, the image-shake correction operation is performed.

Figure 4:
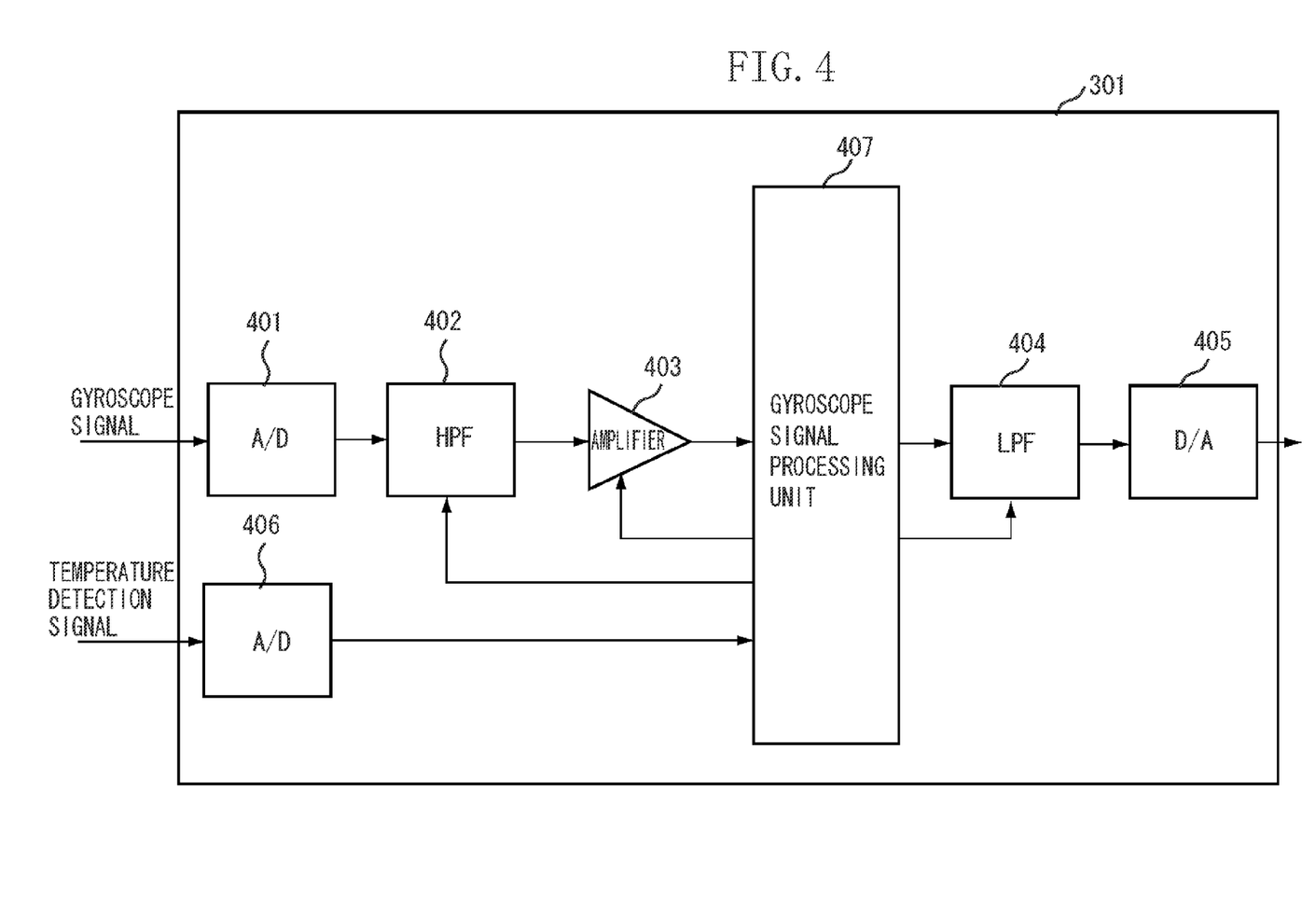
FIG. 4 is a block diagram illustrating details of a main part in an image stabilization control unit in FIG. 3.

FIG. 4 is a block diagram illustrating details of a main part in the image stabilization control unit 301 in FIG. 3.

In FIG. 4, an A/D converter 401 converts the gyroscope signal output from the gyroscope unit 302 or 303 into a digital signal. A high-pass filter (HPF) 402 removes a DC component and its cutoff frequency is changeable. An amplifier 403 is used to amplify a signal, and its gain can be changed.

A low-pass filter (LPF) 404 is used to convert an angular velocity signal (the gyroscope signal) into an angle signal. A D/A converter 405 converts a digital signal into an analog signal.

An A/D converter 406 converts a temperature detection signal output from the temperature detection unit 312 into a digital signal. A gyroscope signal processing unit 407 processes the signal output from the HPF 402 and controls the states of the filters and the like.

The gyroscope signal output from the gyroscope unit 302 or 303 is converted into a digital signal by the A/D converter 401, a DC component in the digital signal is removed by the HPF 402 with a predetermined cutoff frequency, and the digital signal is amplified with an appropriate gain by the amplifier 403 and input to the gyroscope signal processing unit 407.

The angular velocity signal processed in the gyroscope signal processing unit 407 is converted into the angle signal by the LPF 404 and converted into an amount of movement of the shift lens 103 for correcting the shake of a camera (image shake). The signal processed in the LPF 404 is converted into an analog signal by the D/A converter 405 and input into the comparator 308 or 309 illustrated in FIG. 3 as a correction position signal.

Control in the gyroscope signal processing unit 407 is described with reference to a flow chart in FIG. 5.

In step S101, when the power supply of the imaging apparatus is on, the gyroscope signal processing unit 407 starts operating.

In step S102, the capture of the gyroscope signal is started and the measurement of a timer t1 incorporated therein is started.

In step S103, it is determined whether measurement of the timer t1 reaches a predetermined cycle T1. If the measurement of the timer t1 has not reached the predetermined cycle T1 (NO in step S103), the process proceeds to step S104 to process the gyroscope signal using the various circuits described in FIG. 3.

A default cutoff frequency for a startup is set to the HPF 402. In step S105, the shift lens is controlled based on the output obtained by processing the gyroscope signal to perform an image-shake correction.

In step S109, if the power supply switch is turned on, the operations from step S103 to S105 is repeated to continue an image-shake correction.

In step S103, if measurement of the timer t1 reaches the predetermined cycle T1 (YES in step S103), the process proceeds to step S106 from step S103. The timer t1 is reset (initialized) after measurement of the timer t1 has reached the predetermined cycle T1 and starts measurement again.

In step S106, the temperature detection unit 312 detects temperature. In step S107, a difference between the previous and the current temperature detected by the temperature detection unit 312 is calculated and then the change rate in temperature is calculated.

In step S108, the gyroscope signal processing unit 407 sets the cutoff frequency of the HPF 402 based on the calculated change rate in the temperature.

The cutoff frequency of the HPF 402 may be determined referring to a table, which is stored in the gyroscope signal processing unit 407, and which associates the change rate in the temperature with the cutoff frequency of the HPF 402.

Alternatively, the change rate in temperature may be multiplied by a predetermined coefficient to set the cutoff frequency of the HPF 402. A table or a coefficient different according to shooting modes may be provided to change the cutoff frequency of the HPF 402 for the change rate in temperature in respective modes.

The cutoff frequency set in step S108 described above is reflected in the gyroscope signal processing in the following step S104. More specifically, the cutoff frequency of the HPF 402 is set to the cutoff frequency set by the gyroscope signal processing unit 407.

In step S109, if the power supply switch is turned off, the process proceeds to step S110 to turn off the power supply of the imaging apparatus.

Figure 6A:
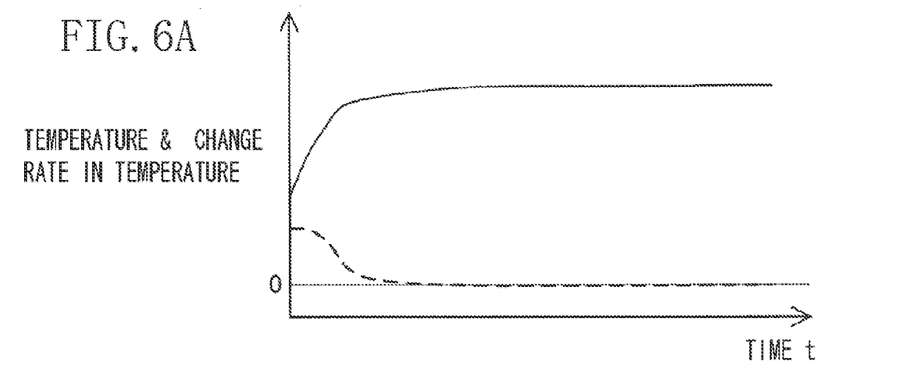
FIGS. 6A, 6B, 6C, and 6D each illustrate a relationship between a change rate in temperature and a cutoff frequency of HPF according to the first exemplary embodiment of the present invention.
Figure 6B:
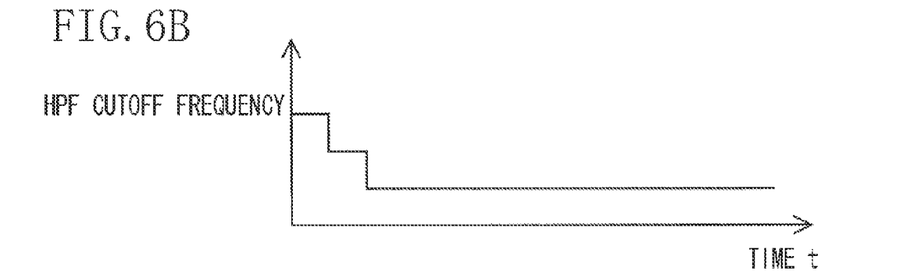
Figure 6C:
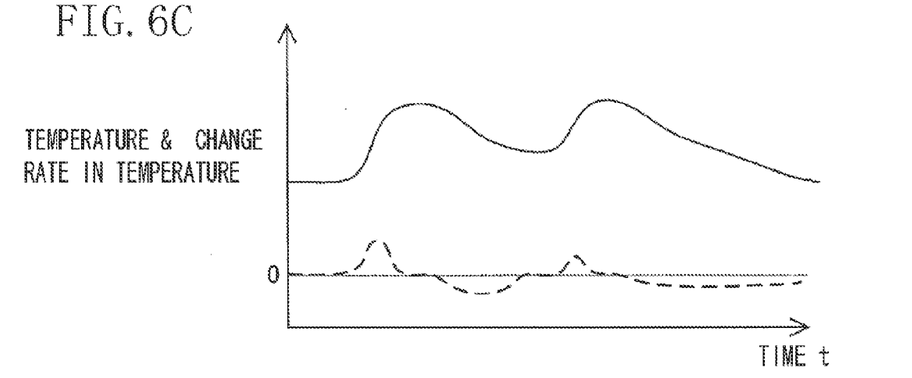
Figure 6D:
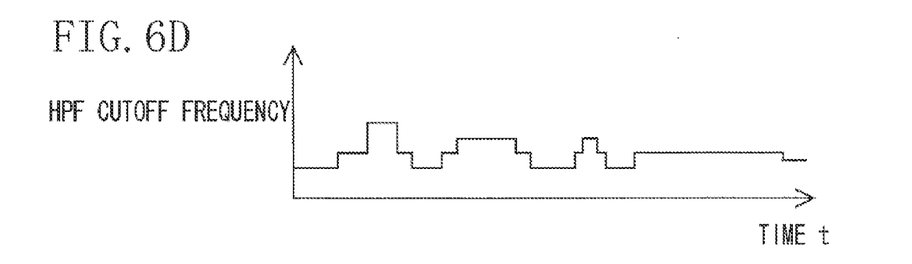

FIGS. 6A and 6C illustrate temperature detected by the temperature detection unit 312 in the gyroscope unit (the angular velocity sensor) or vivinity thereof and the calculated change rate in temperature. FIGS. 6B and 6D illustrate examples of the cutoff frequency of the HPF 402 set according to the change rate in temperature.

FIGS. 6A and 6B illustrate the case where temperature suddenly rises and then temperature is kept high, which may occur when the power supply of the imaging apparatus is turned on. In this case, if change in temperature is large, the cutoff frequency of the HPF 402 is increased (refer to FIG. 6B) to prevent the erroneous determination of the gyroscope signal processing even if temperature drift occurs in the gyroscope unit (the angular velocity sensor).

The erroneous determination of the gyroscope signal processing controls the shift lens 103 to cancel a large change in output due to the temperature drift. Accordingly, the shift lens 103 is moved and stopped in the vicinity of end of the movable range, which significantly degrades the image stabilization performance.

When the change rate in temperature is large as illustrated in FIGS. 6A and 6B, the cutoff frequency of the HPF 402 is increased to prevent the shift lens 103 from being stopped in the vicinity of the end of the movable range. As a result, the image stabilization performance may not be significantly degraded.

Thereafter, when the temperature of the angular velocity sensor is kept high and the change rate in temperature becomes small, the cutoff frequency of the HPF 402 is lowered so that the image stabilization performance for the lower frequency band is increased.

FIGS. 6C and 6D illustrate the case where the gyroscope unit (the angular velocity sensor) or the vicinity thereof rises and falls in temperature by turning on and off the power saving mode of the image pickup unit 109 or the display unit 112 at the time of switching a camera mode or shooting in the OVF mode. The term "switching a camera mode" refers to switching from the play back mode to the still image shooting mode or from the play back mode to the moving image shooting mode.

The gyroscope unit or the vivinity thereof rises and falls in temperature under the following conditions. Starting of the image pickup unit and the control unit generates heat and increases temperature. In the OVF mode, the image pickup unit is normally brought into the power saving mode. At the time of shooting, the image pickup unit starts up to increase temperature. Similarly, switching from the play back mode to the still image shooting mode or the moving image shooting mode also increases temperature.

On the other hand, switching from the EVF mode to the OVF mode brings the image pickup unit into the power saving mode to decrease temperature. In addition, when the shooting is finished at the time of shooting in the OVF mode, the image pickup unit is brought into the power saving mode to decrease temperature. In the OVF mode, therefore, temperature consecutively rises and falls at the time of shooting exposure.

If temperature rises, the cutoff frequency of the HPF 402 is increased as described above. When temperature rapidly falls and the change rate in temperature becomes a large negative value, the cutoff frequency of the HPF 402 is increased similarly. This is because the gyroscope signal processing unit 407 causes an erroneous determination similarly when the output is substantially changed in the positive and the negative direction by the influence of the temperature drift.

With the above configuration, by changing the cutoff frequency of the HPF 402 according to the change rate in temperature, the influence of change in output of the gyroscope units (the angular velocity sensors) 302 and 303 due to the temperature drift can be prevented. As a result, the significant degradation of the image-shake correction performance can be prevented.

An imaging apparatus including an image-shake correction apparatus according to a second exemplary embodiment of the present invention is described below. The configuration of the imaging apparatus is similar to that described in the first exemplary embodiment (in FIGS. 1 to 4).

Figure 5:
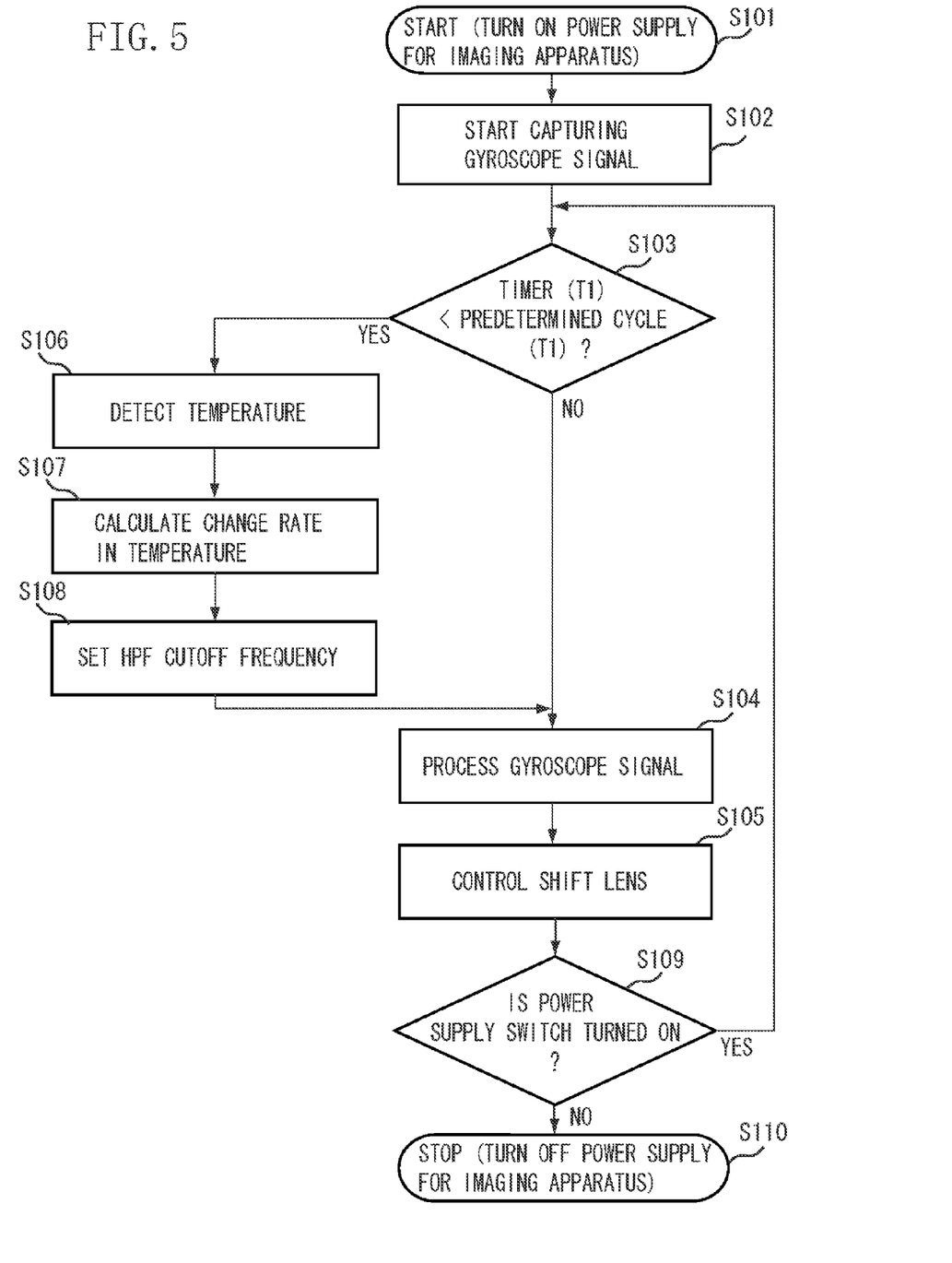
FIG. 5 is a flow chart illustrating an operation of a gyroscope signal processing unit according to a first exemplary embodiment of the present invention.
Figure 7:
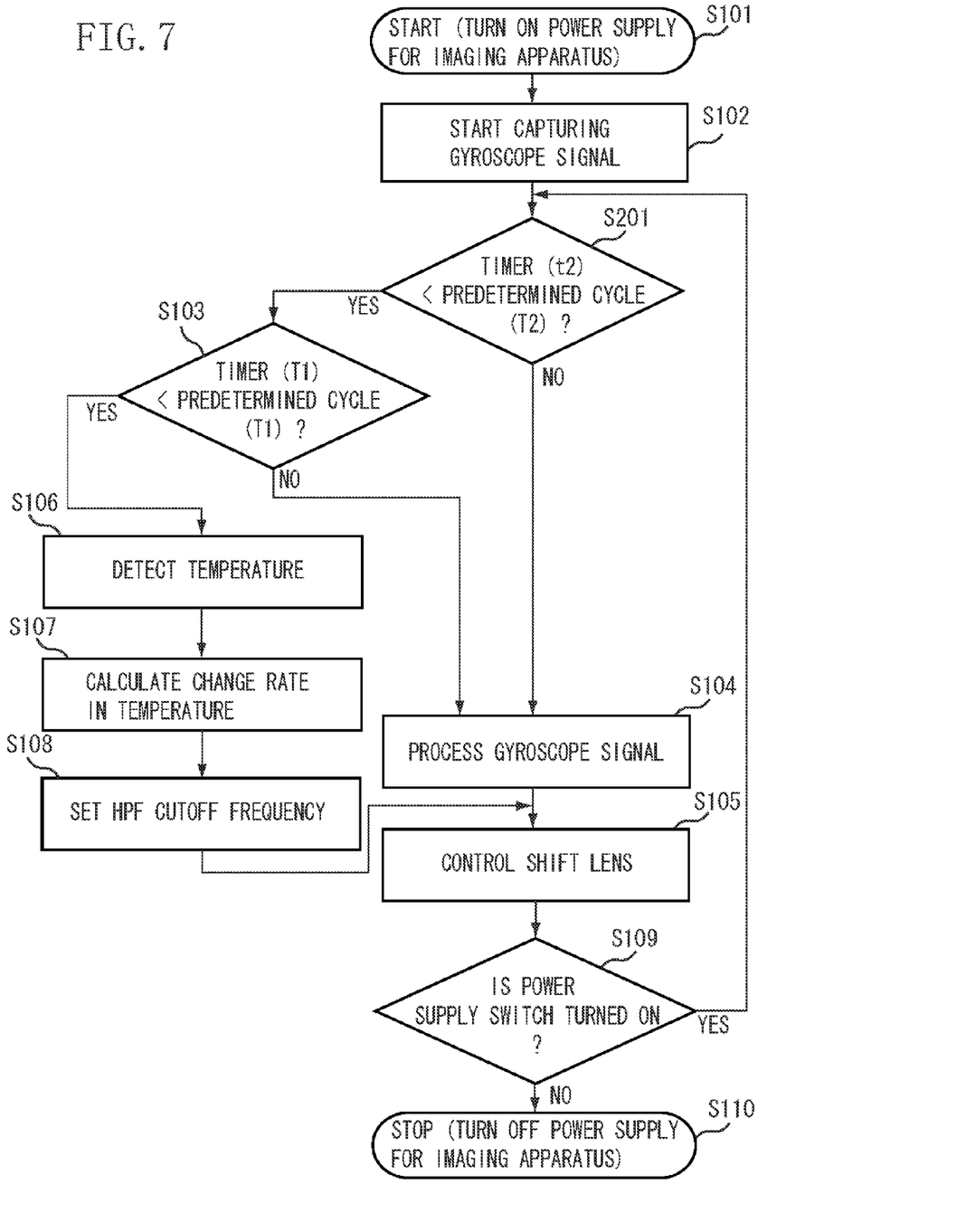
FIG. 7 is a flow chart illustrating an operation of a gyroscope signal processing unit according to a second exemplary embodiment of the present invention.

FIG. 7 is a flow chart illustrating the operation of the gyroscope signal processing unit 407 according to the second exemplary embodiment of the present invention and corresponds to FIG. 5 in the first exemplary embodiment. The parts performing the similar operations are given the same step numbers to omit the description thereof.

In step S201, the cutoff frequency of the HPF 402 is changed according to the change rate in temperature of the gyroscope unit (the angular velocity sensor) or the vivinity thereof (in steps S103 to S109) until measurement of an internal timer t2, which starts measurement when the power supply was turned on, reaches a predetermined time T2.

If measurement of the timer t2 is not less than the predetermined time T2 (NO in step S201), the process proceeds to step S104 from step S201. In other words, the calculation of the change rate in temperature and the process for changing the cutoff frequency of the HPF 402 are stopped and the cutoff frequency of the HPF 402 is returned to the default.

With this configuration, when the temperature of the gyroscope unit (the angular velocity sensor) or the vivinity thereof becomes stable with the lapse of the predetermined time T2 after startup and the influence of the temperature drift is eliminated, the calculation load of processing the gyroscope signal can be reduced.

The predetermined time T2 is longer than the predetermined cycle T1. More specifically, the term "predetermined cycle T1" refers to a cyclic timer for measuring the change rate in temperature and is a cycle of 1 msec, for example. On the other hand, the term "predetermined time T2" refers to the lapse of a predetermined time after startup and is 1 minute, for example, after startup.

An imaging apparatus including an image-shake correction apparatus according to a third exemplary embodiment of the present invention is described below. The configuration of the imaging apparatus is similar to that in the first exemplary embodiment in (in FIGS. 1 to 4).

Figure 8:
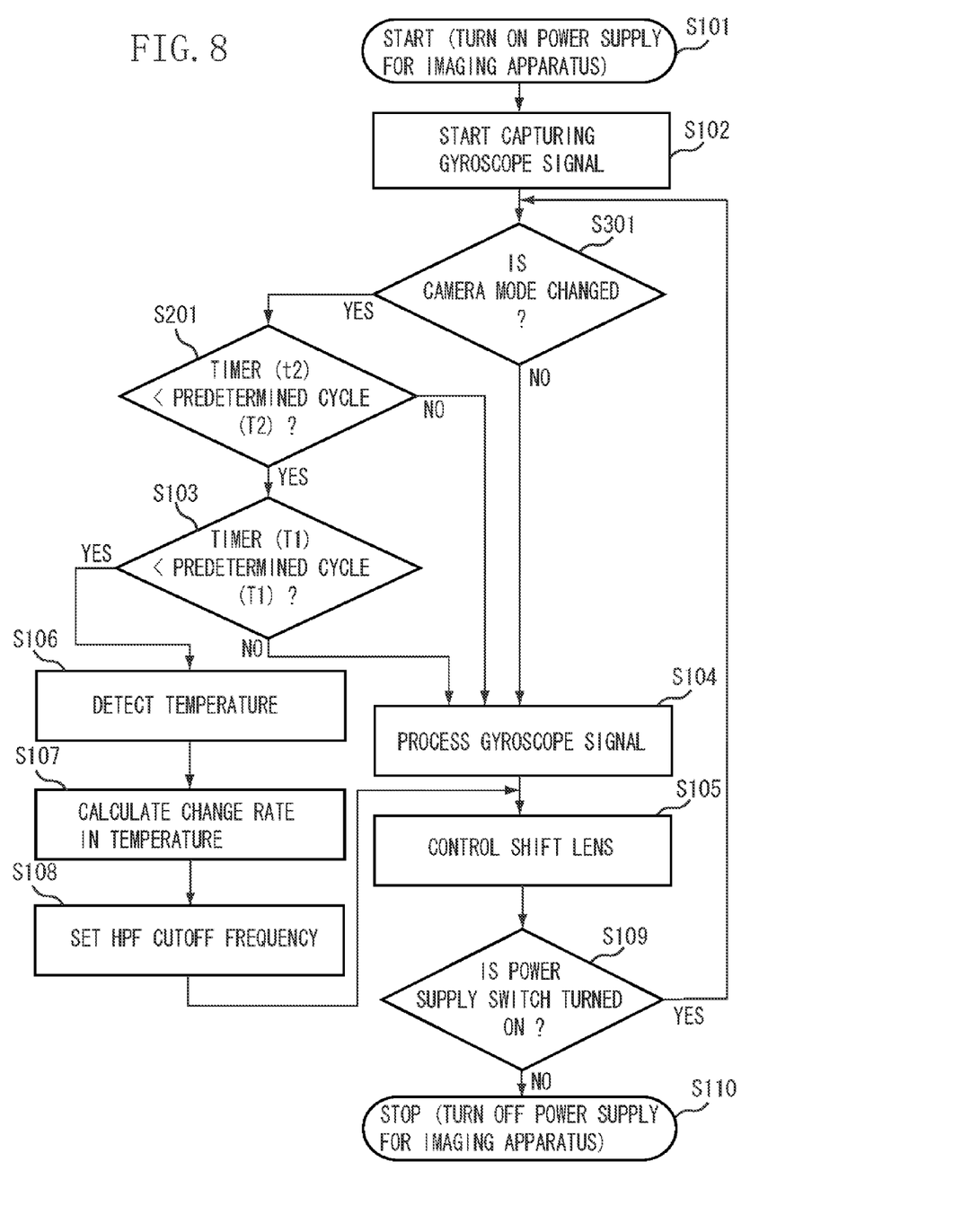
FIG. 8 is a flow chart illustrating an operation of a gyroscope signal processing unit according to a third exemplary embodiment of the present invention.

FIG. 8 is a flow chart illustrating the operation of the gyroscope signal processing unit 407 according to the third exemplary embodiment of the present invention and corresponds to FIGS. 5 and 7 in the first and the second exemplary embodiments. The parts performing the similar operations are given the same step numbers to omit the description thereof.

In step S301, a determination is made as to whether an instruction for switching the camera mode is issued from the operation unit 115. For example, it is determined that the instruction for switching is issued when the EVF or the OVF mode is switched or the shooting mode is switched to the play back mode, for example. In other words, it is determined that a mode is switched when a large change in temperature is caused by bringing the image pickup unit 109 and the display unit 112 into the normal operation mode or the power saving mode, for example.

If it is determined that the camera mode is changed (YES in step S301), as is the case with the second exemplary embodiment, the change rate in temperature is calculated only for the period of the predetermined time T2 to change the cutoff frequency of the HPF 402.

The predetermined time T2 has passed after the mode is changed (YES in step S201), the calculation of the change rate in temperature and the process for changing the cutoff frequency of the HPF 402 are stopped and the cutoff frequency of the HPF 402 is returned to the default.

In the OVF mode, the normal operation mode and the power saving mode are changed in the image pickup unit 109 and the display unit 112 each time a still image is captured, so that the cutoff frequency of the HPF 402 may be changed according to the change rate in temperature while the imaging apparatus is in the OVF mode.

At startup, increase in temperature at the time of shooting a moving image is equal to (or less than) increase in temperature at the time of shooting a still image. When a clock frequency is decreased to a half to save power at the time of shooting a moving image, change in temperature becomes small. In the case of a full clock, which is similarly used in the shooting of a still image, change in temperature at the time of shooting a still image is equal to change in temperature at the time of shooting a moving image. Whether to use a half clock or a full clock changes depending on models.

According to the third exemplary embodiment, the above imaging apparatus has a plurality of the camera modes. The frequency characteristic of the HPF 402 is changed according to the change rate in temperature detected by the temperature detection unit 312 when the respective camera modes are switched.

The imaging apparatus is also provided with the operation unit 115 (a viewfinder switching unit) configured to switch between the electronic and the optical viewfinder. The frequency characteristic of the HPF 402 is changed according to the change rate in temperature detected by the temperature detection unit 312 when the viewfinder mode is switched.

Furthermore, the frequency characteristic of the HPF 402 is changed according to the change rate in temperature detected by the temperature detection unit 312 at the time of shooting a still image in the optical viewfinder mode.

The above imaging apparatus further includes a play back mode in which recorded still and moving images are played back. The frequency characteristic of the HPF 402 may be changed according to the change rate in temperature detected by the temperature detection unit 312 when the play back mode is switched to the shooting mode.

The frequency characteristic of the HPF 402 may be changed according to the change rate in temperature detected by the temperature detection unit 312 according to the shooting modes.

The frequency characteristic of the HPF 402 is changed according to the change rate in temperature detected by the temperature detection unit 312 at the time of turning on the power supply or for the predetermined time T2 after the mode is switched.

As described above, the change of the frequency characteristic of the HPF 402 according to the change rate in temperature detected by the temperature detection unit 312 in response to a sudden change in temperature of the gyroscope unit (the angular velocity sensor) allows preventing the degradation of the image stabilization performance caused by temperature drift due to a sudden change in temperature.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-282882 filed Nov. 4, 2008, which is hereby incorporated by reference herein in its entirety.

What is claimed is:

1. An image-shake correction apparatus comprising:
a shake detection unit configured to detect a shake applied to the image-shake correction apparatus;
a shake correction unit configured to correct the shake of an image caused by the shake;
a drive unit configured to drive the shake correction unit;
a filtering unit configured to remove a specific frequency component from the output of the shake detection unit;
a characteristic change unit configured to change the frequency characteristic of the filtering unit; and
a temperature detection unit configured to detect temperature of the shake detection unit or a vicinity thereof;
wherein the characteristic change unit changes the frequency characteristic of the filtering unit according to a change rate in temperature detected by the temperature detection unit.

2. The image-shake correction apparatus according to claim 1, wherein the characteristic change unit changes the frequency characteristic at the time of turning on a power supply or for a predetermined time after the power supply is turned on.

3. The image-shake correction apparatus according to claim 1, wherein the characteristic change unit changes the frequency characteristic according to the change rate in temperature detected by the temperature detection unit at the time of switching among a plurality of modes.

4. The image-shake correction apparatus according to claim 3, further comprising a viewfinder switching unit configured to switch between an electronic and an optical viewfinder, wherein the characteristic change unit changes the frequency characteristic according to the change rate in temperature detected by the temperature detection unit when a viewfinder mode is changed by the viewfinder switching unit.

5. The image-shake correction apparatus according to claim 4, wherein the characteristic change unit changes the frequency characteristic according to the change rate in temperature detected by the temperature detection unit at the time of shooting a still image in the optical viewfinder mode.

6. The image-shake correction apparatus according to claim 3, wherein the image-shake correction apparatus has a play back mode in which recorded still and moving images are played back, and wherein the characteristic change unit changes the frequency characteristic according to the change rate in temperature detected by the temperature detection unit when the image-shake correction apparatus is switched from the play back mode to a shooting mode.

7. The image-shake correction apparatus according to claim 3, wherein the characteristic change unit changes the frequency characteristic according to the change rate in temperature detected by the temperature detection unit for a predetermined time after the mode is changed.

8. An imaging apparatus having a plurality of modes, the imaging apparatus comprising:
an image-shake correction apparatus including:
a shake detection unit configured to detect a shake applied to the image-shake correction apparatus;
a shake correction unit configured to correct the shake of an image caused by the shake;
a drive unit configured to drive the shake correction unit;
a filtering unit configured to remove a specific frequency component from the output of the shake detection unit;
a characteristic change unit configured to change the frequency characteristic of the filtering unit; and
a temperature detection unit configured to detect temperature of the shake detection unit or in a vicinity of the shake detection unit;
wherein the characteristic change unit changes the frequency characteristic of the filtering unit according to a change rate in temperature detected by the temperature detection unit at the time of switching the mode.

9. An image-shake correction apparatus, comprising:
a shake detection unit configured to detect a shake applied to the image-shake correction apparatus;
a shake correction unit configured to correct the shake of an image caused by the shake;
a drive unit configured to drive the shake correction unit;
a filtering unit configured to remove a specific frequency component from the output of the shake detection unit;
a temperature detection unit configured to detect temperature of the shake detection unit or in a vicinity of the shake detection unit;
a control unit configured to calculate a change rate in temperature detected by the temperature detection unit and to change the frequency characteristic of the filtering unit,
wherein the control unit changes the frequency characteristic of the filtering unit according to the change rate in temperature.

10. The image-shake correction apparatus according to claim 9, wherein the control unit changes the frequency characteristic at the time of turning on a power supply or for a predetermined time after the power supply is turned on.

11. An image-shake correction apparatus according to claim 9, wherein the control unit changes the frequency characteristic according to the change rate in temperature detected by the temperature detection unit at the time of switching among a plurality of modes.

12. The image-shake correction apparatus according to claim 11, further comprising a viewfinder switching unit configured to switch between an electronic and an optical viewfinder, wherein the control unit changes the frequency characteristic according to the change rate in temperature detected by the temperature detection unit when a viewfinder mode is changed by the viewfinder switching unit.

13. The image-shake correction apparatus according to claim 12, wherein the control unit changes the frequency characteristic according to the change rate in temperature detected by the temperature detection unit at the time of shooting a still image in the optical viewfinder mode.

14. The image-shake correction apparatus according to claim 11, wherein the image-shake correction apparatus has a play back mode in which recorded still and moving images are played back, and wherein the control unit changes the frequency characteristic according to the change rate in temperature detected by the temperature detection unit when the image-shake correction apparatus is switched from the play back mode to a shooting mode.

15. The image-shake correction apparatus according to claim 11, wherein the control unit changes the frequency characteristic according to the change rate in temperature detected by the temperature detection unit for a predetermined time after the mode is changed.

16. An image capturing apparatus comprising an image-shake correction apparatus, wherein the image-shake correction apparatus comprises:

a shake detection unit configured to detect a shake applied to the image-shake correction apparatus;

a shake correction unit configured to correct the shake of an image caused by the shake;

a drive unit configured to drive the shake correction unit;

a filtering unit configured to remove a specific frequency component from the output of the shake detection unit;

a temperature detection unit configured to detect temperature of the shake detection unit or in a vicinity of the shake detection unit;

a control unit configured to calculate a change rate in temperature detected by the temperature detection unit and to change the frequency characteristic of the filtering unit, wherein the control unit changes the frequency characteristic of the filtering unit according to the change rate in temperature.

* * * * *